(12) United States Patent  
Bulyko (10) Patent No.: US 7,774,197 B1
(45) Date of Patent: Aug. 10, 2010

(54) MODULAR APPROACH TO BUILDING LARGE LANGUAGE MODELS

(75) Inventor: Ivan Ivanovich Bulyko, Cambridge, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 955 days.

(21) Appl. No.: 11/529,663

(22) Filed: Sep. 27, 2006

(51) Int. Cl.
*G06L 17/27* (2006.01)

(52) U.S. Cl. ............................ 704/9; 704/255; 704/257

(58) Field of Classification Search .................. 704/1, 704/4, 9, 10, 257, 255, 270, 275
See application file for complete search history.

(56) References Cited

U.S. PATENT DOCUMENTS

| | | | |
|---|---|---|---|
| 5,467,425 A | 11/1995 | Lau et al. | |
| 5,651,096 A * | 7/1997 | Pallakoff et al. | ............ 704/275 |
| 7,016,830 B2 | 3/2006 | Huang et al. | |
| 7,275,029 B1 * | 9/2007 | Gao et al. | ...................... 704/9 |
| 2003/0216919 A1 | 11/2003 | Roushar | |
| 2005/0021322 A1 | 1/2005 | Richardson et al. | |
| 2005/0055217 A1 | 3/2005 | Sumita et al. | |
| 2005/0216265 A1 | 9/2005 | Chelba et al. | |
| 2005/0256715 A1 | 11/2005 | Okimoto et al. | |
| 2006/0009965 A1 | 1/2006 | Gao et al. | |
| 2006/0031061 A1 | 2/2006 | Xun | |
| 2006/0053015 A1 | 3/2006 | Lai et al. | |

OTHER PUBLICATIONS

OCH, Franz, et al., "The Google Statistical Machine Translation System for the 2005 NIST MT Evaluation", Abstract, 36 pp. Jun. 20, 2005.
Stolcke, A., "SRILM—An Extensible Language Modeling Toolkit", *Proc. Intl. Conf. on Spoken Language Processing*, vol. 2, pp. 901-904 Denver, (PDF) (2002).
Stolcke, A., "Entropy-Based Pruning of Backoff Language Models" *Proc. DARPA Broadcast News Transcription and Understanding Workshop*, pp. 270-274, Lansdowne, VA. (HTML, PDF) (1998).
Chen, S.F., et al., "An Empirical Study of Smoothing Techniques for Language Modeling" Center for Research in Computing Technology, Harvard University, 64 pp., Jul. 28, 1998.

* cited by examiner

*Primary Examiner*—Huyen X. Vo
(74) *Attorney, Agent, or Firm*—Ropes & Gray LLP (57) ABSTRACT

Methods for building arbitrarily large language models are presented herein. The methods provide a scalable solution to estimating a language model using a large data set by breaking the language model estimation process into sub-processes and parallelizing computation of various portions of the process.

26 Claims, 7 Drawing Sheets

MODULAR APPROACH TO BUILDING LARGE LANGUAGE MODELS

GOVERNMENT CONTRACT

The U.S. Government has a paid-up license in this invention and the right in limited circumstances to require the patent owner to license others on reasonable terms as provided for by the terms of Contract No. NBCHCO30014 awarded by DARPA IAO.

BACKGROUND

Language models provide probabilities for sequences of words and are a primary component in most modern speech and language applications. These models are generated from a set of training data by counting the frequency of occurrence of sequences of n words in the training data (where n is an integer). Sequences of n words are referred to as n-grams. N-grams are classified based on the number of words included in the n-gram. For example, a unigram is a single word, a bigram is an ordered sequence of two words, a trigram includes three words, and a 5-gram includes five words. Because not all possible sequences of words will appear in the training data, back-off modeling techniques have been developed to assign estimated frequencies to non-appearing sequences.

Many such applications, in particular, automatic speech recognition (ASR) and machine translation (MT), have evolved over the past decade, offering high performance and usability. Today, despite extensive research on novel approaches, the standard back-off n-gram language model remains the model of choice in most applications due to its efficiency and reliability. Significant gains in performance are achieved by utilizing larger amounts of training data available for language modeling. However, very large data sets (e.g. data sets including billions of words) pose a computational challenge where one must be able to estimate billions of parameters. Systems and methods are needed for reducing the memory requirements of language models without reducing model accuracy.

SUMMARY

The invention, in various embodiments, addresses the computational challenge of estimating a language model using a large data set. More particularly, according to one aspect, the invention provides a scalable solution by breaking the language model estimation process into sub-processes and parallelizing computation of various portions of the process.

According to one aspect, the invention provides a method of building a language model which begins with providing a text and a first set of count files. Respective count files are associated with one or more corresponding text elements. A series of consecutive text elements is selected from the text to form an n-gram. The n-gram is assigned to one or more count files of the first set of count files based on the presence of a selected text element in the n-gram.

The process of assigning the n-gram to a count file includes, for example, increasing a count corresponding to the n-gram. The method may further include computing probability estimates for the n-grams assigned to the count files.

In one embodiment, the series of consecutive text elements used to form the n-gram includes a current text element and a history of text elements. The selected text element, i.e. the text element used to assign the n-gram to a count file, is the most recent text element in the history, where the history includes the text elements which occurred prior to the current text element. In constructing an n-gram, a predetermined number of the history text elements are included. For example, trigrams from the phrase "see Spot run to Jane" include "see Spot run", "Spot run to", and "run to Jane". The last element of each trigram is the current text element (i.e. "run", "to", and "Jane", respectively), and the second-to-last element being the most recent history element (i.e. "Spot", "run", and "to", respectively). The trigrams may be denoted as (run|Spot, see), (to|run, Spot), and (Jane|to, run), respectively. Note that a text element may be a word, a comma, a period, a beginning-of-sentence marker, an end-of-sentence marker, or any other grammatical or formatting element. The n-grams are derived from text elements in the text.

In one embodiment, the series of text elements may comprise a single text element, and thus the n-gram is a unigram. In some implementations, unigrams are assigned to more than one count file of a set of count files. In one example, unigrams are assigned to each of the count files. In other embodiments, the n-gram may be a bigram, a trigram, a four-gram, a five-gram, a six-gram, a seven-gram, and eight-gram, or longer than an eight-gram.

According to one implementation, the method includes merging the first set of count files to a single count file. The method may also include a second set of count files, and each count file of the second set of count files may correspond to a respective count file of the first set of count files. In one embodiment, the method includes merging, in parallel, each count file of the first set of count files with each of the respective count files of the second set of count files. The second set of count files, in one embodiment, are populated with n-grams derived from a second text. According to various implementations, the method includes generating a language model from the first set of count files.

According to another aspect, the invention provides a method of building a language model. The method includes providing a first language model comprising a first set of data files and a second language model comprising a second set of data files. The language models are then merged in parallel.

In one embodiment, providing language model includes calculating a plurality of probabilities related to the likelihood of selected n-grams and storing the plurality of probabilities in data files corresponding to the language model. According to one embodiment, the data files are language model subsets.

According to one feature, the method includes generating a combined language model. The combined language model is generated by merging respective data files of the first language model with corresponding data files of the second language model. The corresponding data files are merged in parallel. In one embodiment, merging respective ones of the first set of data files with corresponding ones of the second set of data files includes interpolating corresponding probability measurements.

In one implementation, each of the first set of data files is associated with a set of text elements, and each of the corresponding second set of data files is associated with the same set of text elements. According to one embodiment, the set of text elements may include words, commas, periods, beginning-of-sentence markers, end-of-sentence markers, and other grammatical and formatting elements.

In one implementation, the data files of the first set of data files and the data files of the second set of data files store probability measurements. The probability measurements indicate the probability of occurrence of various selected n-grams. In one implementation, a smoothing algorithm is used to assign probability estimates to additional n-grams that are not present in the data files. In some implementations, either instead of or in addition to a smoothing algorithm, back-off weights are calculated to assign probability estimates to a second set of n-grams that are not present in the data files.

According to one implementation, merging respective data files of the first set of data files with corresponding data files of the second set of data files results in a set of merged data files. Respective data files of the set of merged data files may then be pruned. According to one feature, the respective data files may be pruned in parallel.

BRIEF DESCRIPTION OF THE DRAWINGS

The foregoing and other objects and advantages of the invention will be appreciated more fully from the following further description thereof, with reference to the accompanying drawings. These depicted embodiments are to be understood as illustrative of the invention and not as limiting in any way.

Throughout the figures, the characters c, k, n, m and x are used in the reference numbers. These characters may represent any selected integer, with the same character representing the same selected integer throughout the figures.

DETAILED DESCRIPTION OF THE DRAWINGS

To provide an overall understanding of the invention, certain illustrative embodiments will now be described, including systems, methods and devices for building arbitrarily large language models. However, it will be understood by one of ordinary skill in the art that the systems and methods described herein can be adapted and modified for other suitable applications and that such other additions and modifications will not depart from the scope hereof.

Large language models are generally built using several corpora of data. Each corpus usually includes text data of a particular origin. For example, one corpus may include text taken from several years of Wall Street Journal newspapers. Another corpus may be transcribed speech from recorded telephone conversations. Each corpus may be used to build an independent language model, and these language models may be combined to form a larger, more accurate, language model.

Building large language models from text data typically involves two steps. First, n-gram counts are collected. An n-gram is a particular series of n text elements. An n-gram count is the number of occurrences of that n-gram observed in a corpus of text. Next, n-gram probabilities are estimated from the n-gram counts. N-gram probabilities are typically noted in the form $p(w_c|w_h)$ and denote the probability of a current word $w_c$ appearing next given a history of previous words $w_h$.

Figure 1:
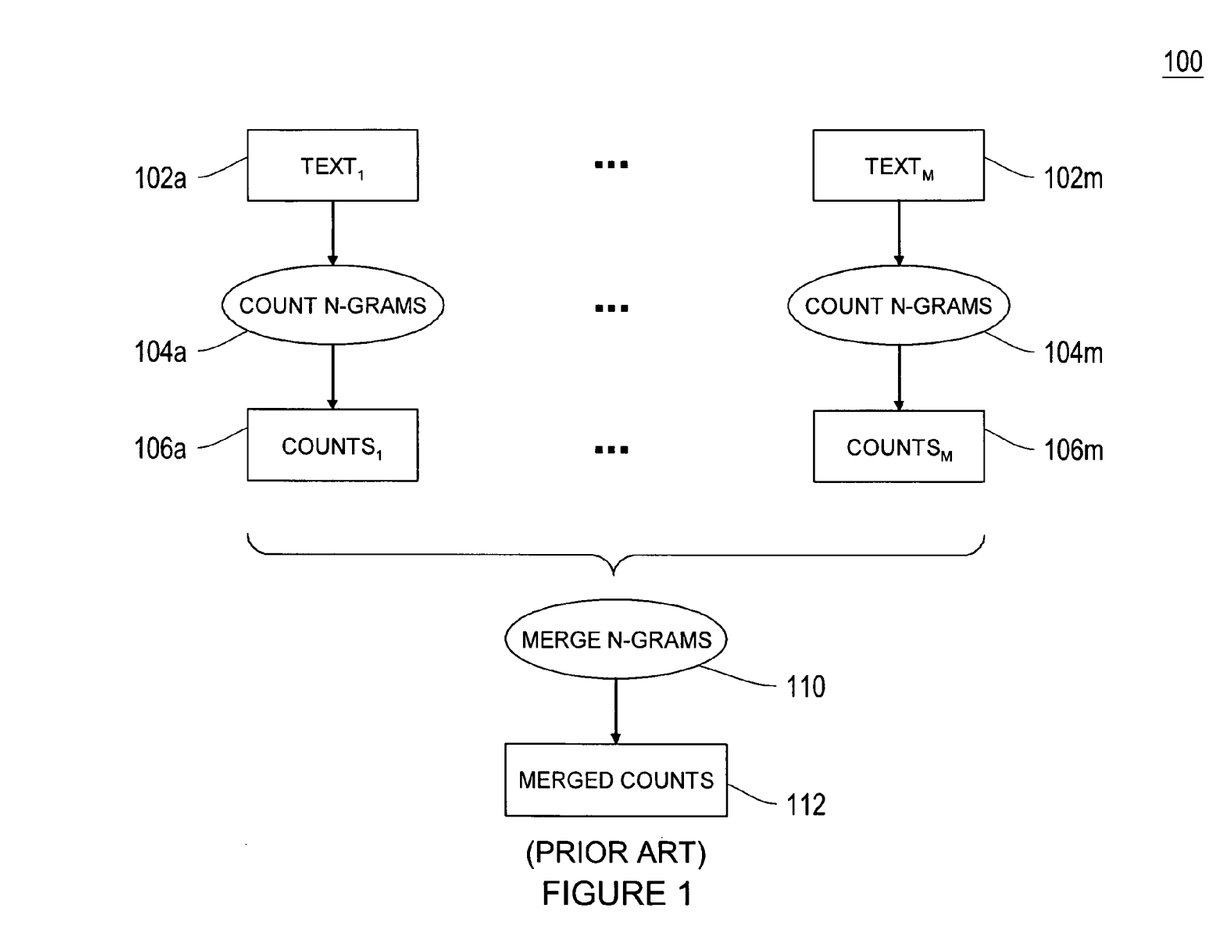
FIG. 1 is a block diagram of a prior art method of generating counts used in language models.

FIG. 1 is a block diagram of a prior art method 100 of generating n-gram counts. The method 100 begins with a plurality of text files 102a-102m. For each text file 102a-102m, the n-grams (usually unigram, bigrams, and/or trigrams) occurring in the text files 102a-102m are counted (step 104a-104m), resulting in n-gram counts 106a-106m. Next, the n-gram counts 106a-106m are merged (step 110), resulting in a merged n-gram count 112. Merged n-gram count 112 includes the total number of occurrences of the n-grams observed in the combined set of text files 102a-102m. According to this method, the individual n-gram counts 106a-106m are serially merged to the merged n-gram count 112.

Figure 2:
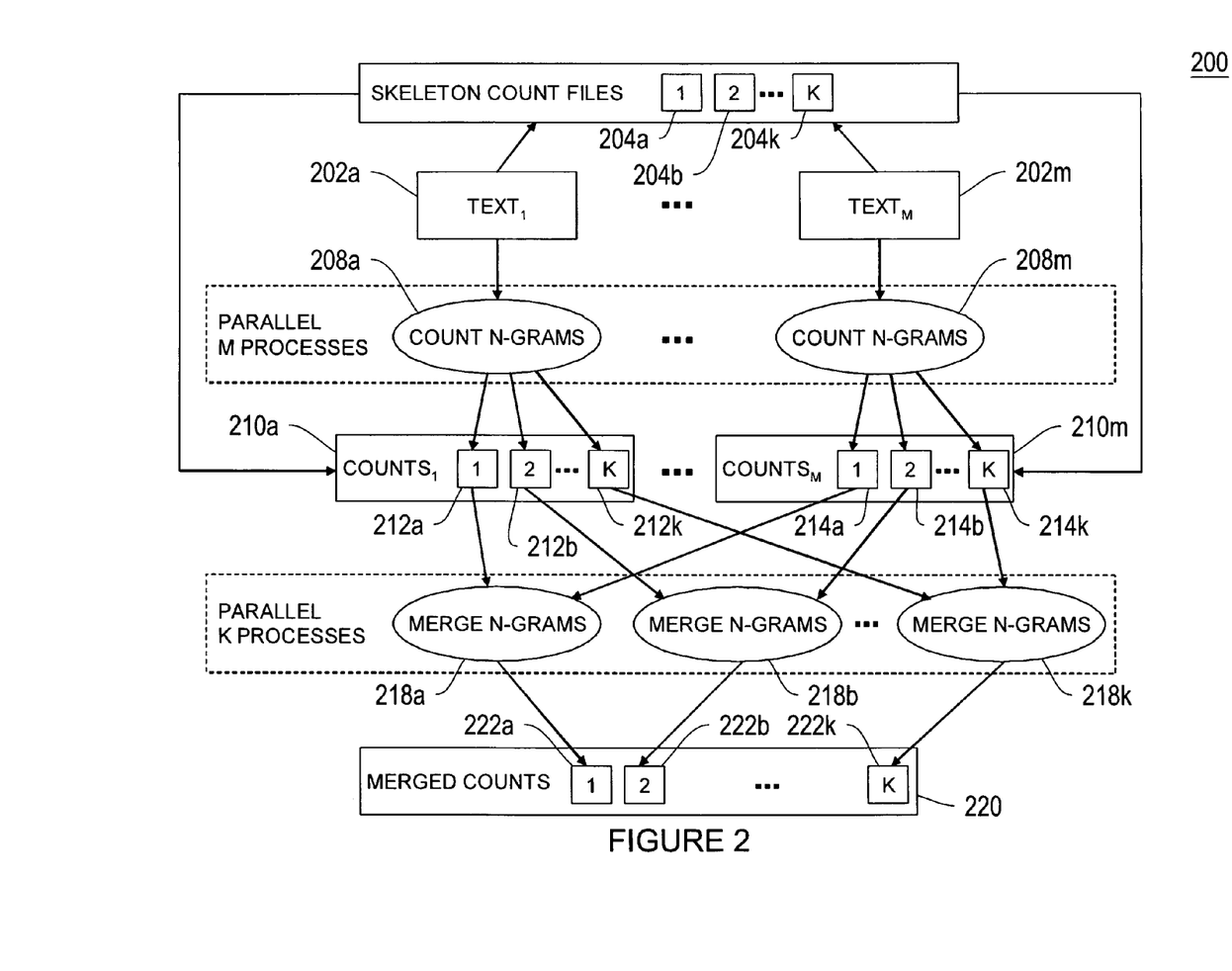
FIG. 2 is a block diagram of a method of generating counts according to an illustrative embodiment the invention.

FIG. 2 is a block diagram of a method 200 of generating counts according to an illustrative embodiment of the invention. The method 200 begins with the provision of a plurality of text files 202a-202m. Each text file 202a may be an independent training corpus, or it may be a portion of a larger training corpus, which has been split into m files. The text files 202a-202m are used to generate a set of k skeleton count files 204a-204k, as explained in greater detail with respect to FIG. 3. Each skeleton count file 204a-204k is associated with one or more text elements from the text files 202a-202m. A text element associated with a particular skeleton count file is referred to herein as an "assigned element."

For each text file 202a-202m, occurrences of n-grams in the text files 202a-202m are counted (208a-208m) resulting in n-gram counts 210a-210m. Each n-gram count 210a-210m includes k count files, such as count files 212a-212k, generated from text file 202a, and 214a-214k, generated from text file 202m. The count files 212a-212k and 214a-214k correspond to the previously generated skeleton count files 204a-204k. Each count file 212a-212k and 214a-214k includes a subset of the n-gram counts 210a-210m. The subset of a particular count file 212a-212k and 214a-214k is based on the assigned elements of a corresponding skeleton count file 204a-204k. A count file includes the counts of all n-grams in which the most recent element in the history of an n-gram is one of the count file's assigned elements. For example, n-grams $(*|w_{i-1})$, $(*|w_{i-1}, w_{i-2})$, ..., $(*|w_{i-1}, \ldots, w_{i-n+2})$, where * denotes a current word, $w_{i-1}$ denotes the immediately preceding word, $w_{i-2}$ denotes the word preceding word $w_{i-1}$, etc., are added to the same count file, since they share the most recent history element $w_{i-1}$. If an n-gram is not currently present in a count file, the n-gram is added to the file and given a count of one, while if the n-gram is already present in the count file, the count is increased by one. Respective count files 212a-212k and 214a-214k of the n-gram counts 210a-210m, generated from the various text files 202a-202m, include counts of corresponding n-grams. For example, the n-gram counts included in count file 212a correspond to the n-gram counts of count file 214a, since both count files 212a and 214a have the same set of assigned elements, and all n-grams from the respective text files 202a and 202m having one of the assigned elements as the most recent history element are included in the respective count file 212a and 214a. Similarly, the n-gram counts included in count file 212b correspond to the n-gram counts of count file 214b. And, the n-gram counts included in count file 212k correspond to the n-gram counts of count file 214k. Additionally, the count files may include a count of all unigrams in the corresponding text file.

The n-gram counts 210a-210m from the text files 202a-202m are merged in parallel at 218a-218k by merging each count file 212a-214k with the respective corresponding count files 212a-214k of the n-gram counts 210a-210m. For example, count file 212a is merged with 214a at 218a, in parallel with the merger of count file 212b with 214b at 218b, and count file 212k with 214k at 218k. This process results in the merged count 220, having merged count files 222a-222k.

According to various embodiments, the method 200 is performed on a conventional computer system having a processor, non-volatile storage (e.g. a hard drive or optical drive), and random access memory (RAM). In one example, the method 200 is performed on a personal computer with an Intel Pentium 4 (3 GHz) processor, 1 GB of RAM and a 200 GB hard drive. As described further in reference to FIG. 3, the skeleton count files 204a-204k are generated such that the count files 212a-214k are small enough such that the computer system can perform the merging in steps 218a-218k without accessing the non-volatile storage of the computer system. Since corresponding count files (e.g. 212a and 214a) are merged independent of other count files (212b-212k and 214b-214k), during merging, only one set of corresponding count files (e.g. 212a through 214a) needs to be uploaded to RAM at a time, while the other count files (e.g. 212b-212k through 214b-214k) may be stored in non-volatile storage. Performing the merging step 218 in RAM increases efficiency and requires far less RAM than merging all n-gram counts at the same time.

Previous n-gram counting methods stored counts for all n-grams in a single data file. As this file can grow in size rapidly, such methods have often required pruning the count files (discarding the least-frequent n-grams) prior to estimating a language model to decrease count file size to fit into system RAM. By enabling the merging in steps 218a-218k to occur without pruning, the method 200 prevents the decrease in accuracy inherent in prior language model creation methods.

Figure 3:
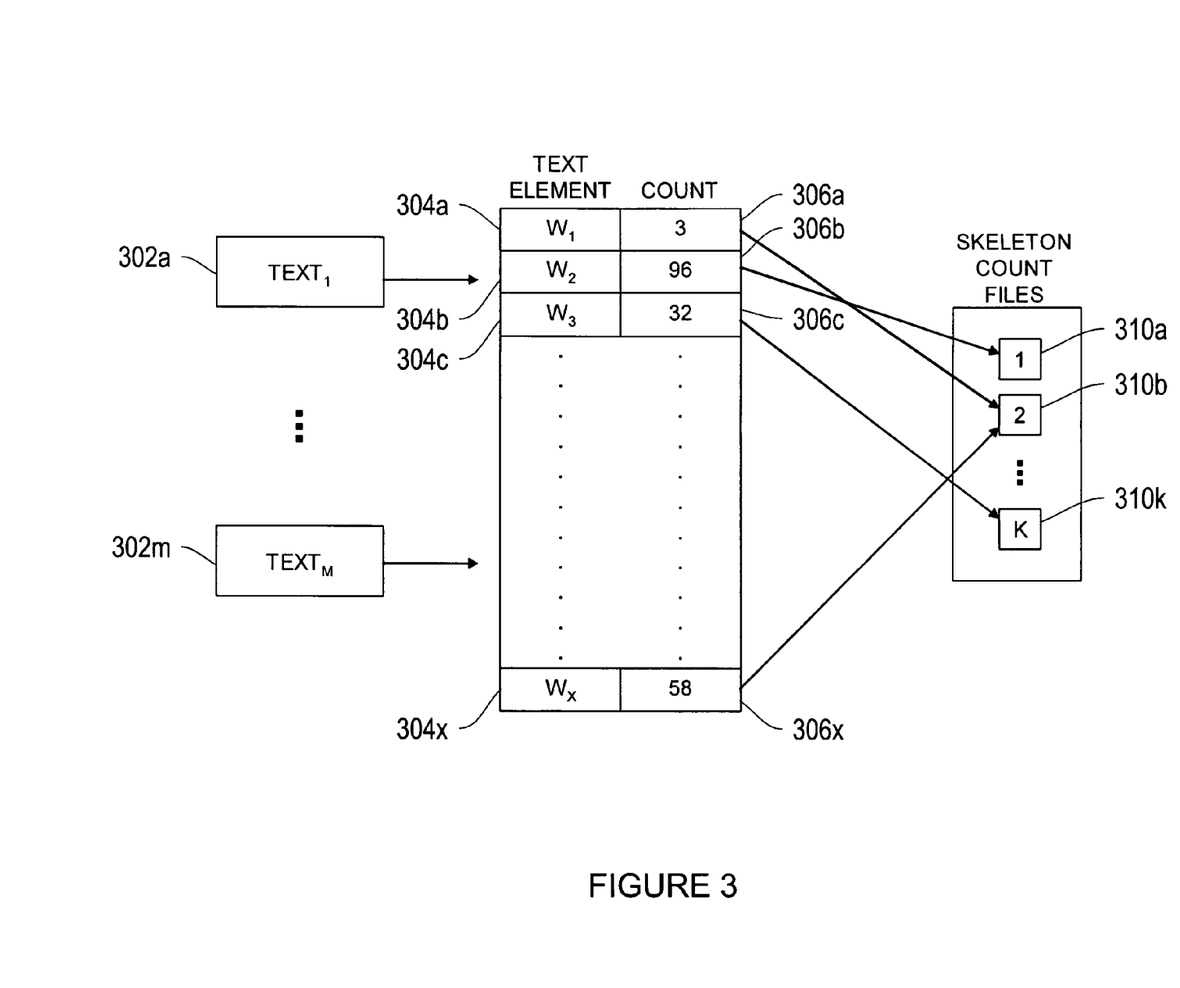
FIG. 3 is a block diagram of a method of generating count files.

FIG. 3 is a block diagram of a method 300 of generating k skeleton count files 310a-310k from m text files 302a-302m. Text elements 304a-304k are assigned to the skeleton count files 310a-310k as described in relation to FIG. 2, resulting in lists of assigned elements. The number k of skeleton count files 310a-310k may be determined based on the amount of RAM available in the computer system. In various embodiments, about 10, about 25, about 50, about 75, about 100, about 150, about 200, about 250, or about 300 count files are used. To assign the text elements 304a-304x, in one illustrative embodiment, the total number of occurrences of each text element 304a-304x in the text files 302a-302m is counted yielding counts 306a-306x. The counts 306a-306x are stored in memory with the corresponding text elements 304a-304x. Alternatively, counts 306a-306x are generated from a representative sample of text from one or more of the text files. For example, $w_1$ may occur 3 times, $w_2$ may occur 96 times, $w_3$ may occur 32 times, and $w_x$ may occur 58 times. Depending in part upon the text element counts 306a-306x, the text elements 304a-304x are divided among the plurality of skeleton count files 310a-310k. For example, text element 304a may be assigned to skeleton count file 310c and text element 304c may be assigned to skeleton count file 310a, etc. The text elements 304a-304x associated with each skeleton count file 310a-310k preferably are assigned such that the count files that are derived from the skeleton count files 310a-310k (e.g. the count files 212a-214k of FIG. 2), will be of similar sizes after the assignment of all associated n-grams to the count files. Splitting the count data into count files of approximately equal size allows an even distribution of computational load among the merging processes 218. In one embodiment, the approximate distribution is achieved by round-robin assignment of text elements. For example, the text element with the highest count is assigned to the first count file 310a, the text element with the second highest count is assigned to the second count file 310b, and so forth, with text element k+1 assigned back to the first count file 310a.

Factors other than the number of times a text element occurs may contribute to the assignment of a text element to a skeleton count file. For example, the number of different text elements that may precede a selected text element may contribute to the assignment of the selected text element to a skeleton count file, with text elements that may be preceded by a large number of different text elements spread evenly among the skeleton count files 310a-310k.

Referring back to FIG. 2, when assigning counts to count files 212a-212k and 214a-214k, it is not necessary for all text elements to have an explicit assignment to a skeleton count file 204a-204k. In one implementation, any text element that does not have an explicit assignment is automatically mapped to a special "catch-all" skeleton file. Even though the number of such text elements can be large (i.e. all text elements that did not occur in the text files 302a-302m that were used for extracting the assigned elements), these elements are likely to be infrequent and, hence, will not be a big factor in memory usage.

Figure 4:
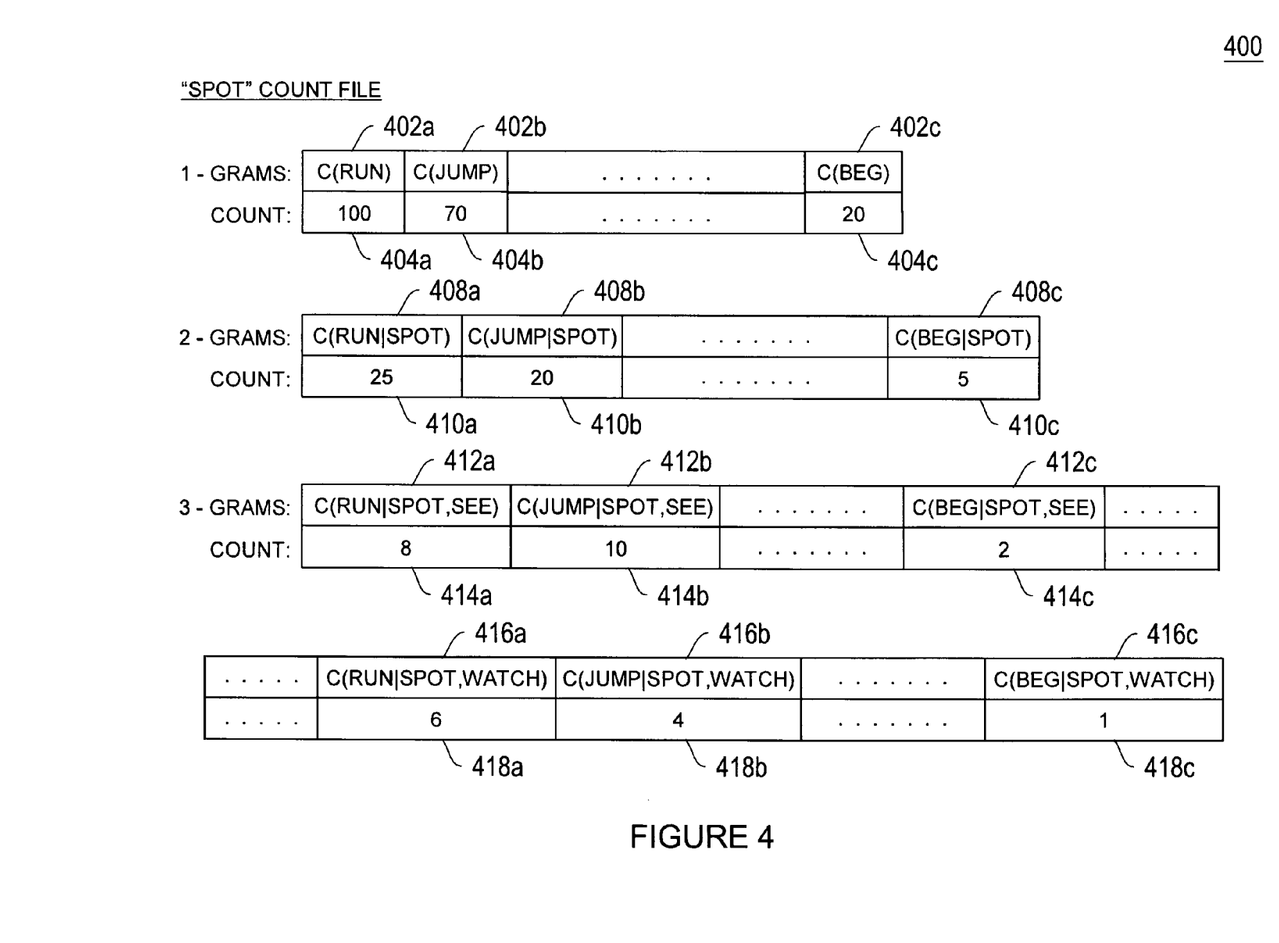
FIG. 4 is a block diagram of an exemplary count file.

FIG. 4 is a block diagram of an exemplary count file 400 generated, for example, from text file 202a. The exemplary count file 400 includes the counts 410a-410c, 414a-414c and 418a-418c. Counts 410a-410c, etc., correspond to n-grams 408a-408c (bigrams), 412a-412c (trigrams) and 416a-416c (trigrams). The count file 400 also includes combined counts 404a-404c of all unigrams 402a-402c from a text file (e.g. text file 202a of FIG. 2).

One of the text elements assigned to count file 400 is the word "Spot." As shown in the figure, the bigrams 408a-408c have "Spot" as the most recent text element in their history. Each bigram 408a-408c includes a current element which occurred after the word "Spot," such as run (408a), jump (408b), and beg (408c). In generating the count file 400, each time the word "Spot" was detected in the text file followed by the word "run", the count 410a of bigram (run|Spot) was incremented by one. According to the count file 400, the text file from which the count file 400 was populated included the word "Spot" followed by the word "run" 25 times (410a). "Spot" was followed by the word "jump" 20 times (410b), and was followed by the word "beg" 5 times (410c).

The count file 400 also includes trigrams 412a-412c and 416a-416c. These trigrams 412a-412c and 416a-416c also have "Spot" as the most recent history element. They further include the element which occurred before "Spot" in the text file. For example, in the trigrams 412a-412c, "Spot" is preceded by "see." Again, various words may occur after "Spot," including for example "run" (412a), "jump" (412b), and "beg" (412c). Thus, these trigrams represent the phrases "see Spot run," which occurs 8 times (414a) in the input text file, "see Spot jump," which occurs 10 times (414b) in the input text file, and "see Spot beg," which occurs twice (414c) in the input text file. In another example, as shown in the trigrams 416a-416c of FIG. 4, "Spot" is preceded by the word "watch." These trigrams represent the phrases "watch Spot run," which occurs 6 times (418a) in the input text file, "watch Spot jump," which occurs 4 times (418b) in the input text file, and "watch Spot beg," which occurs once (418c) in the input text file.

Figure 5:
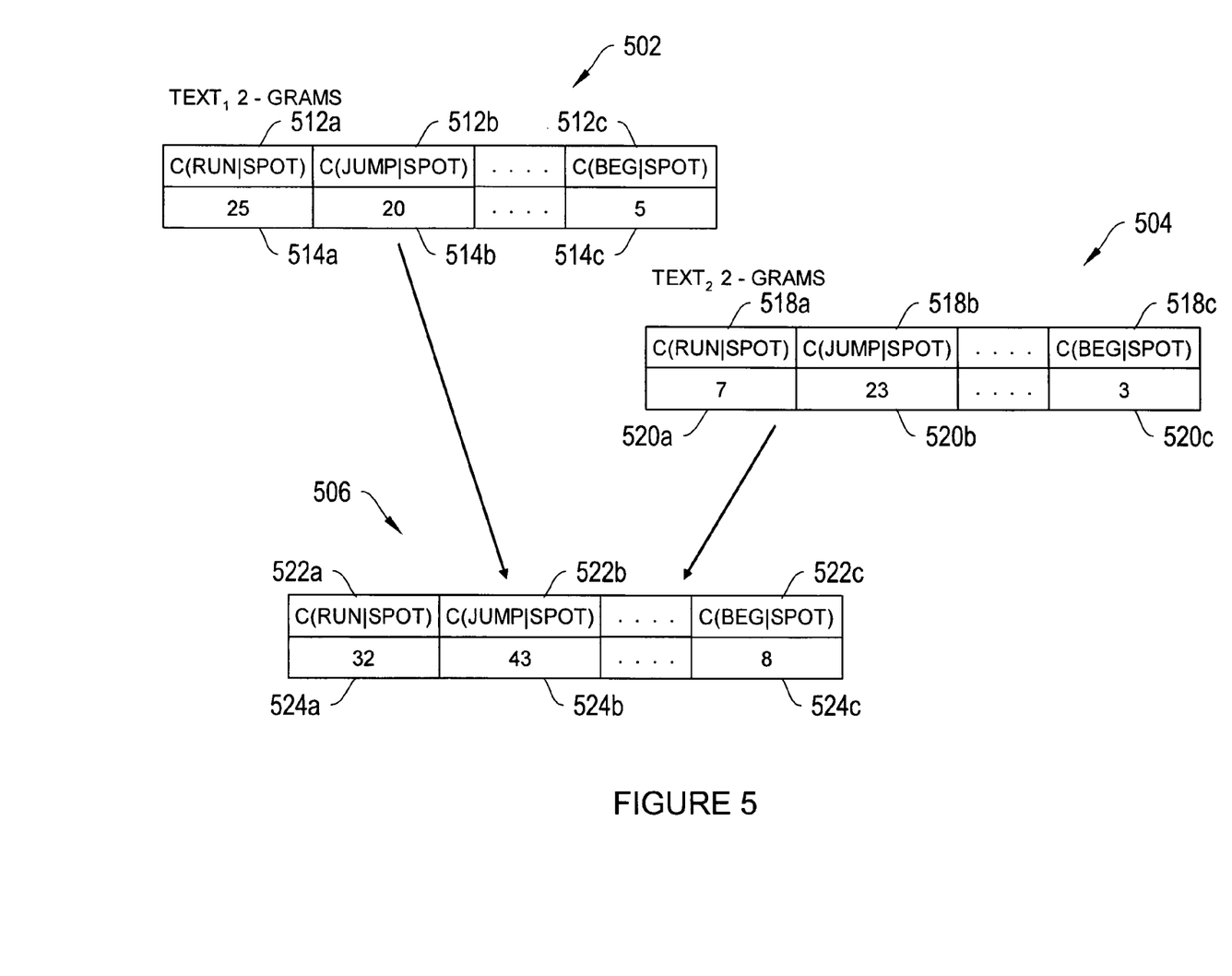
FIG. 5 is a block diagram of two exemplary count files being combined into a merged count file.

FIG. 5 is a functional block diagram of a method of merging two exemplary count files 502 and 504. The count files 502 and 504 are derived from two different text files, but were populated using the same list of assigned elements. Identical n-grams from the count files 502 and 504 are combined by adding their respective counts. For example, the bigram 512a (run|Spot) of the count file 502 is identical to the bigram 518a (run|Spot) of the count file 504, and thus their respective counts 514a (25) and 520a (7) are added to result in the combined count 524a (32) for the bigram 522a (run|Spot) of the merged count file 506. Similarly, the counts 514b and 520b of the bigrams 512b and 518b (jump|Spot) are added to result in the combined count 524b for the bigram 522b, and the counts 514c and 520c of the bigram 512c and 518c (beg|Spot) are added to result in the combined count 524c for the bigram 522c. N-grams unique to each text file are added to the merged count file 506. As mentioned above, the corresponding count files of all the text files of a corpus are preferably merged in parallel.

According to one embodiment, after the n-gram count files have been merged, occurrence probability estimates are calculated for each n-gram to generate a language model. A language model includes a set of probabilities that a particular n-gram will occur in a previously unanalyzed input file (an occurrence probability). Smoothing and/or back-off algorithms are used to assign probabilities to n-grams that either were not observed in the training data or were discarded due to model size constraints, and to adjust the occurrence probabilities of the observed and saved n-grams accordingly. Smoothing provides a "smooth" (or "discounted") probability estimate to the observed n-grams. The back-off algorithm is used to compute probabilities of unseen n-grams.

Most existing smoothing algorithms for estimation of n-gram language model probabilities can be expressed recursively as a linear interpolation of higher and lower order n-gram models (as further described in S. Chen and J. Goodman, "An empirical study of smoothing techniques for language modeling", Center for Research in Computing Technologies, Harvard University, 1998), such as in equation 1, with a uniform $0^{th}$ order distribution:

$$p(w_i|w_{i-1}, \ldots, w_{i-n+1}) = p'(w_{i-1}, \ldots, w_{i-n+1}) + \gamma(w_{i-1}, \ldots, w_{i-n+1}) p(w_i|w_{i-1}, \ldots, w_{i-n+2})$$

Equation 1. Computing n-gram probabilities by interpolating with lower order estimates.

One example smoothing algorithm suitable for this calculation is the Knesser-Ney smoothing algorithm. Another example of a popular smoothing algorithm is the Witten-Bell smoothing algorithm.

A back-off algorithm, which can be combined with smoothing, allows lower order estimates $p(w_i|w_{i-1}, \ldots, w_{i-n+2})$ to be used when the explicit probability $p(w_i|w_{i-1}, \ldots, w_{i-n+1})$ is not present. The lower order estimates are scaled with the corresponding back-off weight $bow(w_{i-1}, \ldots, w_{i-n+1})$. The back-off weights are chosen such that the overall model is normalized, i.e. occurrence probabilities for every n-gram context sum to 1. This can be achieved by using equation 2:

$$bow(w_{i-1}, \ldots, w_{i-n+1}) = \frac{1 - \sum_w p(w|w_{i-1}, \ldots, w_{i-n+1})}{1 - \sum_w p(w|w_{i-1}, \ldots, w_{i-n+2})}$$

Equation 2. Estimation of a back-off weight for a given context involves summing over all probabilities found in that context as well as the corresponding lower-order estimates.

According to one feature, the language model described herein includes the probability estimates derived directly from the counts and also those derived from the smoothing and back-off algorithms described above.

Figure 6:
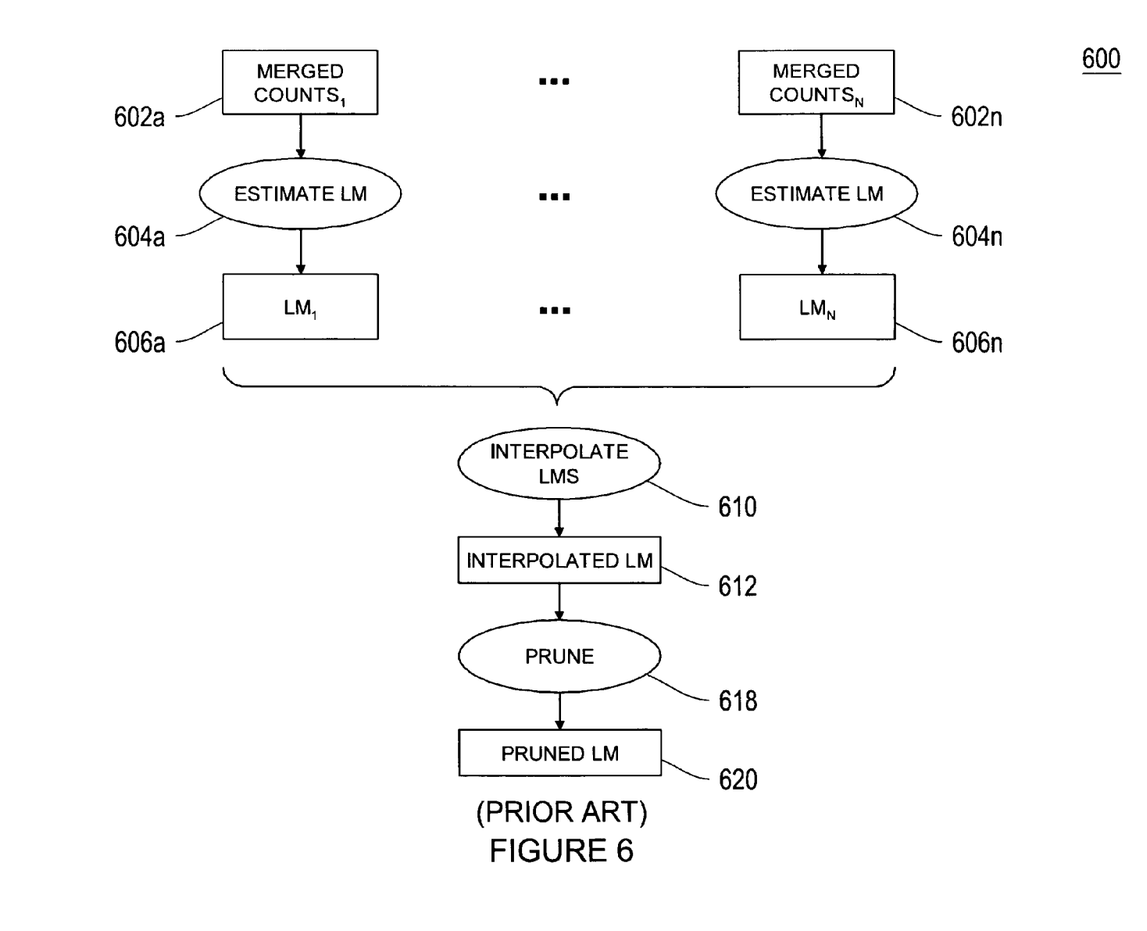
FIG. 6 is a block diagram of a prior art method of generating a language model.

FIG. 6 is a functional block diagram of a prior art method 600 of generating a language model 620 from multiple training corpora. Prior art language models have been trained using more than one input text corpus. The method generates a set of pruned merged counts 602a-602n for each input text corpus, as described in FIG. 1. The pruned merged counts 602a-602n are used to estimate language models (steps 604a-604n). The language models 602a-602n are estimated using n-gram probability estimates derived directly from the merged counts 602a-602n, as well as those derived using smoothing and back-off algorithms to assign probabilities to unobserved or pruned n-grams. A common strategy is to build separate language models 606a-606n from each corpus and then combine these models via linear interpolation (step 610). To perform interpolation, the probability of a word $w_i$ given context h is computed as a linear combination of the corresponding n-gram probabilities from the corpus language models 606a-606n:

$$p(w_i|h) = \Sigma_{s \in \{606a, \ldots, 606n\}} \lambda_s p_s(w_i|h)$$

for all n-grams that are present in any of the language models 606a-606n (i.e. the union of all n-grams). The resulting interpolated language model 612 may then be pruned (step 618), e.g. using the entropy criterion (S. Chen and J. Goodman, "An empirical study of smoothing techniques for language modeling", Center for Research in Computing Technologies, Harvard University, 1998), to meet specific model size requirements. This results in the final pruned language model 620. In some embodiments, especially if the language models 606a-606n are large, interpolation of several models 606a-606n may exceed the computer's physical memory, and thus each model 606a-606n is pruned prior to interpolation.

Figure 7:
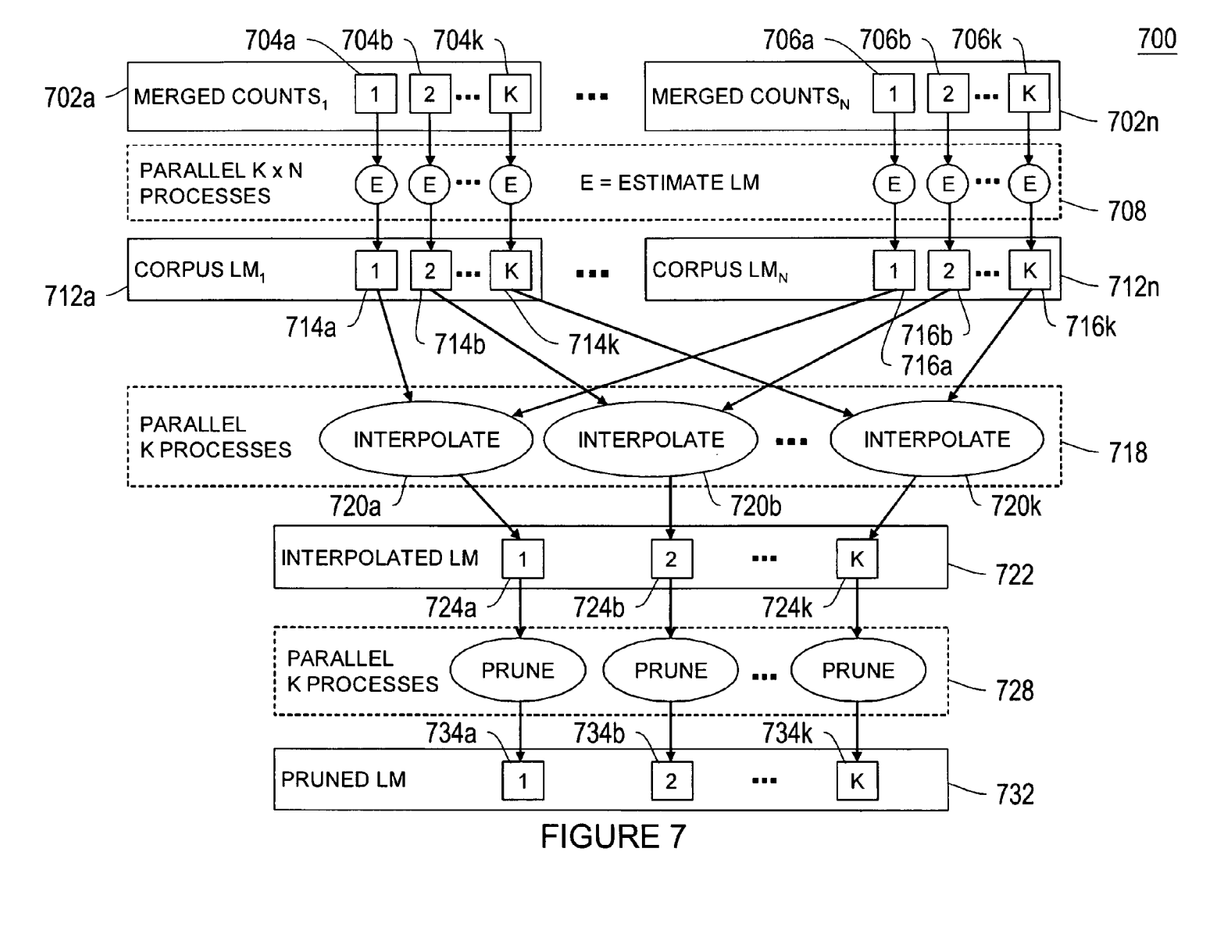
FIG. 7 is a block diagram of a method of generating a language model according to an illustrative embodiment of the invention.

FIG. 7 is a functional block diagram of a method 700 of generating a language model according to an illustrative embodiment of the present invention. The method 700 provides a means for creating large interpolated language models without requiring pruning prior to interpolation. The method 700 begins with the provision or generation of merged counts 702a-702n. Each merged count includes k merged count files 704a-704k and 706a-706k, which are substantially the same as the merged count files 222a-222k of FIG. 2. Corpus language models 712a-712n are generated in parallel at step 708 for each of the merged counts 702a-706k. Each corpus language model 712a-712n includes k corpus language model subsets. Each corpus language model subset 714a-716k corresponds to a merged count file 704a-706k. For example, the corpus language model 712a includes the corpus language model subsets 714a-714k, and the corpus language model 712n includes the corpus language model subsets 716a-716k. The language model subsets 714a-716k are generated for each merged count using the methodology described above, treating each merged count file 704a-706k as an individual merged count.

The next step in the method 700 is interpolation of the corpus language models 712a-712n (step 718). Each of the corresponding corpus language model subsets 714a-716a, 714b-716b, and 714k-716k are interpolated in k parallel interpolation processes 720a-720k. The interpolation results in an interpolated language model 722 comprising k interpolated language model subsets 724a-724k. Optionally, the interpolated language model 722 is pruned (step 728) by pruning each of the interpolated language model subsets 724a-724k. Pruning results in a pruned language model 732 including k pruned language model subsets 734a-734k. The resulting language model, for example the interpolated language model 722 or the pruned language model 732, may be stored either as k individual language model subset files, or combined into a single file.

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which are to be interpreted as broadly as allowed under the law.

What is claimed is:

1. A method of building a language model comprising:
   providing a first language model derived from a first corpus comprising a first set of data files, wherein each of the data files in the first set of data files is associated with a different set of text elements;
   providing a second language model derived from a second corpus different from the first corpus comprising a second set of data files, wherein i) each of the data files in the second set of data files is associated with a different set of text elements, ii) each of the data files in the first set of data files corresponds to a respective data file in the second set of data files, and iii) a data file in the first set of data files corresponds to a data file in the second set of data files if the data file in the first set of data files is associated with a similar set of text elements as is associated with the data file in the second set of data files; and
   merging, in parallel using a computer processor, respective data files in the first set of data files with corresponding data files in the second set of data files, thereby generating a combined language model by merging the first language model with the second language model.

2. The method of claim 1, wherein each of the first set of data files is associated with a set of text elements, and each of the corresponding second set of data files is associated with the same set of text elements.

3. The method of claim 2, wherein a text element is one of a word, a comma, a period, a beginning-of-sentence marker, and an end-of-sentence marker.

4. The method of claim 1, wherein the data files of the first set of data files and the data files of the second set of data files store probability measurements.

5. The method of claim 4, wherein the respective probability measurements indicate the probability of occurrence of respective selected n-grams.

6. The method of claim 5, further comprising using a smoothing algorithm to assign probability estimates to a second set of n-grams that are not present in the first or second sets of data files.

7. The method of claim 5, further comprising calculating back-off weights to assign probability estimates to a second set of n-grams that are not present in the first or second sets of data files.

8. The method of claim 4, wherein merging respective ones of the first set of data files with corresponding ones of the second set of data files comprises interpolating corresponding probability measurements.

9. The method of claim 1, wherein providing a first language model comprises calculating a plurality of probabilities related to the likelihood of selected n-grams and storing the plurality of probabilities in the data files of the first set of data files.

10. The method of claim 1, wherein merging respective data files of the first set of data files with corresponding data files of the second set of data files results in a set of merged data files.

11. The method of claim 10, further comprising pruning, in parallel, respective data files of the set of merged data files.

12. The method of claim 1, wherein:
    each data file comprises data about a plurality of n-grams;
    each n-gram comprises a current text element and a text element history, the text element history comprising text elements preceding the current text element of the n-gram; and
    the n-grams about which data is included in a given data file include those n-grams found in the corpus from which the given data file was derived that have one of the text elements associated with the given data file as a most recent text element in the histories of the respective n-grams.

13. The method of claim 12, wherein a data file in the first set of data files is considered associated with a similar set of text elements as is associated with the data file in the second set of data files if the data files share a similar set of text elements as the most-recent text elements in the histories of the n-grams about which data is stored in the data files.

14. A computer-readable storage containing instructions for causing a computing device to carry out a method of building a language model, comprising:
    providing a first language model derived from a first corpus comprising a first set of data files, wherein each of the first set of data files is associated with a different set of text elements;
    providing a second language model derived from a second corpus different from the first corpus comprising a second set of data files, wherein i) each of the second set of data files is associated with a different set of text elements, ii) each of the data files in the first set of data files corresponds to a respective data file in the second set of data files, and iii) a data file in the first set of data files corresponds to a data file in the second set of data files if the data file in the first set of data files is associated with a similar set of text elements as is associated with the data file in the second set of data files; and
    merging, in parallel, respective data files in the first set of data files with corresponding data files in the second set of data files, thereby generating a combined language model by merging the first language model with the second language model.

15. The computer-readable storage of claim 14, wherein each of the first set of data files is associated with a set of text elements, and each of the corresponding second set of data files is associated with the same set of text elements.

16. The computer-readable storage of claim 15, wherein a text element is one of a word, a comma, a period, a beginning-of-sentence marker, and an end-of-sentence marker.

17. The computer-readable storage of claim 14, wherein the data files of the first set of data files and the data files of the second set of data files store probability measurements.

18. The computer-readable storage of claim 17, wherein the respective probability measurements indicate the probability of occurrence of respective selected n-grams.

19. The computer-readable storage of claim 18, comprising instructions for causing the computing device to use a smoothing algorithm to assign probability estimates to a second set of n-grams that are not present in the first or second sets of data files.

20. The computer-readable storage of claim 18, comprising instructions for causing the computing device to calculate back-off weights to assign probability estimates to a second set of n-grams that are not present in the first or second sets of data files.

21. The computer-readable storage of claim 17, wherein merging respective ones of the first set of data files with corresponding ones of the second set of data files comprises interpolating corresponding probability measurements.

22. The computer-readable storage of claim 14, wherein providing a first language model includes calculating a plurality of probabilities related to the likelihood of selected n-grams and storing the plurality of probabilities in the data files of the first set of data files.

23. The computer-readable storage of claim 14, wherein merging respective data files of the first set of data files with corresponding data files of the second set of data files results in a set of merged data files.

24. The computer readable storage of claim 23, comprising instructions for causing the computing device to prune, in parallel, respective data files of the set of merged data files.

25. The computer-readable storage of claim 14, wherein:
each data file comprises data about a plurality of n-grams; each n-gram comprises a current text element and a text element history, the text element history comprising text elements preceding the current text element of the n-gram; and
the n-grams about which data is included in a given data file include those n-grams found in the corpus from which the given data file was derived that have one of the text elements associated with the given data file as a most recent text element in the histories of the respective n-grams.

26. The computer-readable storage of claim 25, wherein a data file in the first set of data files is considered associated with a similar set of text elements as is associated with the data file in the second set of data files if the data files share a similar set of text elements as the most-recent text elements in the histories of the n-grams about which data is stored in the data files.

* * * * *